US008890924B2

(12) United States Patent
Wu

(10) Patent No.: US 8,890,924 B2
(45) Date of Patent: Nov. 18, 2014

(54) VIDEO CONFERENCE CONTROL METHOD AND CONFERENCE TERMINAL

(71) Applicant: Huawei Device Co., Ltd., Shenzhen (CN)

(72) Inventor: Jiaoli Wu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 86 days.

(21) Appl. No.: 13/689,428

(22) Filed: Nov. 29, 2012

(65) Prior Publication Data

US 2013/0088563 A1 Apr. 11, 2013

Related U.S. Application Data

(63) Continuation of application No. PCT/CN2012/070022, filed on Jan. 4, 2012.

(30) Foreign Application Priority Data

Jan. 4, 2011 (CN) .......................... 2011 1 0000642

(51) Int. Cl.
H04N 7/15 (2006.01)
H04L 12/18 (2006.01)
(52) U.S. Cl.
CPC .............. *H04N 7/15* (2013.01); *H04L 12/1822* (2013.01)
USPC ................... 348/14.07; 348/14.08; 348/14.09
(58) Field of Classification Search
CPC ........... H04N 7/15; H04N 7/152; H04N 7/14; H04N 7/141; H04N 7/142; H04N 7/147; H04L 12/1822
USPC .......................................... 348/14.01–14.16
See application file for complete search history.

(56) References Cited

U.S. PATENT DOCUMENTS 6,211,902 B1 4/2001 Tanoi
7,542,068 B2 6/2009 Eshkoli et al.
(Continued)

FOREIGN PATENT DOCUMENTS

CN 101291398 A 10/2008
CN 101291417 A 10/2008
(Continued)

OTHER PUBLICATIONS

Written Opinion of the International Searching Authority in corresponding International Patent Application No. PCT/CN2012/070022 (Apr. 12, 2012).

(Continued)

Primary Examiner — Melur Ramakrishnaiah
(74) Attorney, Agent, or Firm — Leydig, Voit & Mayer, Ltd.

(57) ABSTRACT

The present invention discloses a video conference control method and a conference terminal. The method includes: receiving multi-video information, where the multi-video information includes videos of at least two remote conference sites; displaying the multi-video information on a display screen, where the display screen includes a main video display area and an auxiliary video selection area; and performing, according to a received conference control operation request, a corresponding conference control operation on a conference site corresponding to a video displayed in the auxiliary video selection area. According to the present invention, the display screen is divided into the main video display area and the auxiliary video selection area, so that a user may perform a conference control operation on a video of a remote conference site through the auxiliary video selection area, a conference site that needs to be viewed is displayed in the main video display area.

15 Claims, 9 Drawing Sheets

(56) References Cited

U.S. PATENT DOCUMENTS

| | | |
|---|---|---|
| 2002/0196746 A1* | 12/2002 | Allen .................... 370/260 |
| 2006/0215765 A1* | 9/2006 | Hwang et al. .......... 375/240.21 |
| 2006/0259552 A1 | 11/2006 | Mock et al. |
| 2007/0263076 A1* | 11/2007 | Andrews et al. ........ 348/14.08 |
| 2009/0037827 A1 | 2/2009 | Bennetts |
| 2010/0095343 A1 | 4/2010 | Kaihotsu |
| 2010/0333004 A1 | 12/2010 | Kristiansen et al. |
| 2012/0038740 A1 | 2/2012 | Zhang et al. |

FOREIGN PATENT DOCUMENTS

| | | |
|---|---|---|
| CN | 101350898 A | 1/2009 |
| CN | 101534411 A | 9/2009 |
| CN | 101772958 A | 7/2010 |

OTHER PUBLICATIONS

International Search Report in corresponding PCT Patent Application No. PCT/CN2012/070022 (Apr. 12, 2012).

Extended European Search Report in corresponding European Patent Application No. 12732468.9 (Aug. 5, 2013).

$1^{st}$ Office Action in corresponding Chinese Patent Application No. 201110000642.8 (Jul. 22, 2013).

* cited by examiner

VIDEO CONFERENCE CONTROL METHOD AND CONFERENCE TERMINAL

CROSS-REFERENCE TO RELATED APPLICATIONS

This application is a continuation of International Patent Application No. PCT/CN2012/070022, filed on Jan. 4, 2012, which claims priority to Chinese Patent Application No. 201110000642.8, filed on Jan. 4, 2011, both of which are hereby incorporated by reference in their entireties.

FIELD OF THE INVENTION

The present invention relates to video communication technologies, and in particular, to a video conference control method and a conference terminal.

BACKGROUND OF THE INVENTION

A video conference system collects video data of a local conference site through multiple cameras and transmits the video data of the local conference site to a remote conference site through a video conference communication network, and receives video data sent by the remote conference site to perform multi-screen output on a display of the local conference site, so as to provide an effect of video communication. The video conference system has multiple video streams for transceiving processing, and each video stream corresponds to one conference terminal.

In a video conference, multiple different kinds of conference site may exist, and the conference site may have one or more display screens to display videos of multiple remote conference sites. In a case with many conference sites, in a main conference site, a conference host needs to perform manipulation such as view selection on the conference sites to view video states of all participants and perform proper manipulation. A manipulation control interface may be a web interface or a touch screen interface. List information of each conference site is displayed on the control interface in a word form or a snapshot form for the conference host to browse and manipulate each conference site.

In the video conference system in the prior art, a multipoint control unit (hereinafter referred to as MCU) transfers a composite video signal to a conference terminal, where the composite video signal includes a combined video bit stream formed of video bit streams from at least one conference terminal, and the composite video signal further includes relevant information of the control interface, for example, information about a conference, such as text data, graphic data, text data in a graph and so on. On a conference terminal side, a user inputs a control request through the control interface, and sends the request information to the MCU. The MCU responds to the request by changing a parameter of the video communication, generates or updates the control interface and control textual and graphical data information relevant to the interface, combines the control interface information and a conference terminal video together, and sends them to the conference terminal.

In the video conference system in the conventional art, the control interface is pushed to the conference terminal by the MCU, the conference terminal performs a conference control operation on relevant conference sites by using options on the interface, and the MCU refreshes the control interface according to the conference control operation so as to implement conference control. A conference site video needs to be controlled by the user through the control interface, and therefore, the user needs to divert attention to operate the control interface, which affects viewing of a conference video. In addition, the control interface is generated by the MCU, and needs to be constantly refreshed according to the operation of the user. The MCU needs to continuously send a data bit stream of the control interface to the conference terminal, and relevant data amount of the control interface is usually large, which affects a response speed of the video conference system, reduces a response speed of the user to perform the conference control operation, and affects using experience of the user.

SUMMARY OF THE INVENTION

The present invention provides a video conference control method and a user terminal, so that a user of a video conference can conveniently and quickly perform operations such as view selection and control on a remote conference site, and using experience of the user is improved.

An embodiment of the present invention provides a video conference control method, where the method includes:
receiving multi-video information, where the multi-video information includes videos of at least two remote conference sites;
displaying the multi-video information on a display screen, where the display screen includes a main video display area and an auxiliary video selection area; displaying a video of a currently viewed remote conference site, where the video is in the multi-video information, in the main video display area; and displaying a video of a remote conference site on which a user performs a conference control operation, where the video is in the multi-video information, in the auxiliary video selection area; and
performing, according to a received conference control operation request, a corresponding conference control operation on a conference site corresponding to a video displayed in the auxiliary video selection area.

The present invention further provides a conference terminal, including:
a receiving module, configured to receive multi-video information, where the multi-video information includes videos of at least two remote conference sites;
a displaying module, configured to display the multi-video information, where a main video display area and an auxiliary video selection area are included; display a video of a currently viewed remote conference site, where the video is in the multi-video information, in the main video display area; and display a video of a remote conference site on which a user performs a conference control operation, where the video is in the multi-video information, in the auxiliary video selection area; and
a conference control operating module, configured to perform, according to a received conference control operation request, a corresponding conference control operation on a conference site corresponding to a video displayed in the auxiliary video selection area.

According to the present invention, the display screen is divided into the main video display area and the auxiliary video selection area, so that the user may perform the conference control operation on the remote conference site through the auxiliary video selection area, and the user, while viewing a conference site video of the main video display area, may perform the conference control operation without diverting attention, which improves conference control operation experience of the video conference.

BRIEF DESCRIPTION OF THE DRAWINGS

To illustrate the technical solutions in the embodiments of the present invention or in the prior art more clearly, the following briefly describes accompanying drawings needed for describing the embodiments or the prior art. Obviously, the accompanying drawings in the following description are some embodiments of the present invention, and persons of ordinary skill in the art may obtain other drawings from these accompanying drawings without making creative efforts.

DETAILED DESCRIPTION OF THE EMBODIMENTS

To make the objectives, technical solutions, and advantages of the present invention more clear, the following clearly and completely describes the technical solutions according to the embodiments of the present invention with reference to the accompanying drawings in the embodiments of the present invention. Obviously, the embodiments in the following description are part of rather than all of the embodiments of the present invention. All other embodiments obtained by persons of ordinary skill in the art based on the embodiments of the present invention without making creative effects shall fall within the protection scope of the present invention.

Figure 1A:
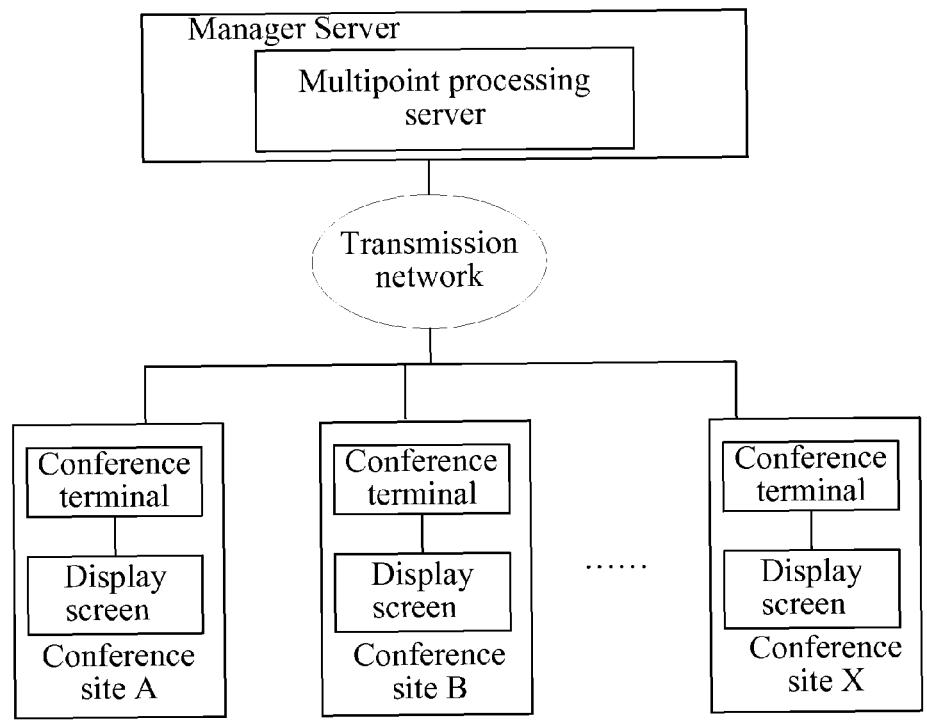
FIG. 1a is a networking diagram of a video conference system according to an embodiment of the present invention.

Referring to FIG. 1a, a networking diagram of a video conference system according to an embodiment of the present invention is shown. In the video conference system of the embodiment of the present invention, display screens of conference sites all adopt a master-slave displaying manner, that is, a display screen is divided into a main video display area and an auxiliary video selection area. A video of a remote conference site viewed currently by a user is displayed in the main video display area, and a video of a remote conference site on which the user performs a conference control operation, where the video is in the multi-video information, is displayed in the auxiliary video selection area, where video information of the remote conference site includes video information of another conference site except a local conference site, and may also include video information of the local conference site. The auxiliary video selection area may display videos of all conference sites except the local conference site, and may also display videos of all the conference sites in the conference (including the video of the local conference site). Through the auxiliary video selection area, the user may perform a conference control operation on the remote conference site, for example, conference control operations such as previewing the conference site, viewing the conference site, deleting the conference site, broadcasting the conference site or roll calling the conference site and so on.

Figure 1B:
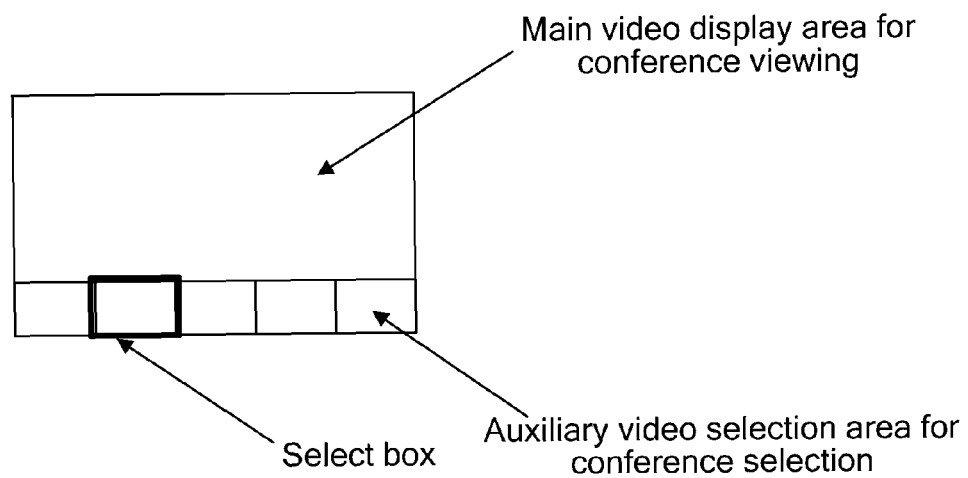
FIG. 1b is a schematic diagram of an interface of a display screen of a conference site according to an embodiment of the present invention.

The display screen may perform displaying in the following manner: the main video display area in the display screen is located in an upper part, and occupies most of the area of the display screen, and the auxiliary video selection area is arranged in a row, and is located in a lower part. The video of the remote conference site used to perform a conference control operation such as previewing the conference site, where the video is in the multi-video information, is displayed in the auxiliary video selection area. For example, a schematic diagram of an interface of the display screen of the conference site is as shown in FIG. 1b. The main video display area of the display screen of the conference site is one large picture, and the auxiliary video selection area is formed of five small pictures (and may also not be limited to five). The area of the main video display area is large, which make it convenient for a participant to see a currently selected remote conference site clearly. The area of the auxiliary video selection area is small, which does not affect viewing, by a user, of the main video area, and enables the user to preview a video of another conference site in it at the same time.

The participant can view the video of the currently selected remote conference site through the main video display area, and can perform a conference control operation on the remote conference site through the auxiliary video selection area. For example, the participant previews a video of each conference site from the auxiliary video selection area, and when determining, during browsing, video information of a conference site that the participant wants to view, the participant may request the video conference system to switch the video of the conference site to the main video display area for displaying.

Figure 1C:
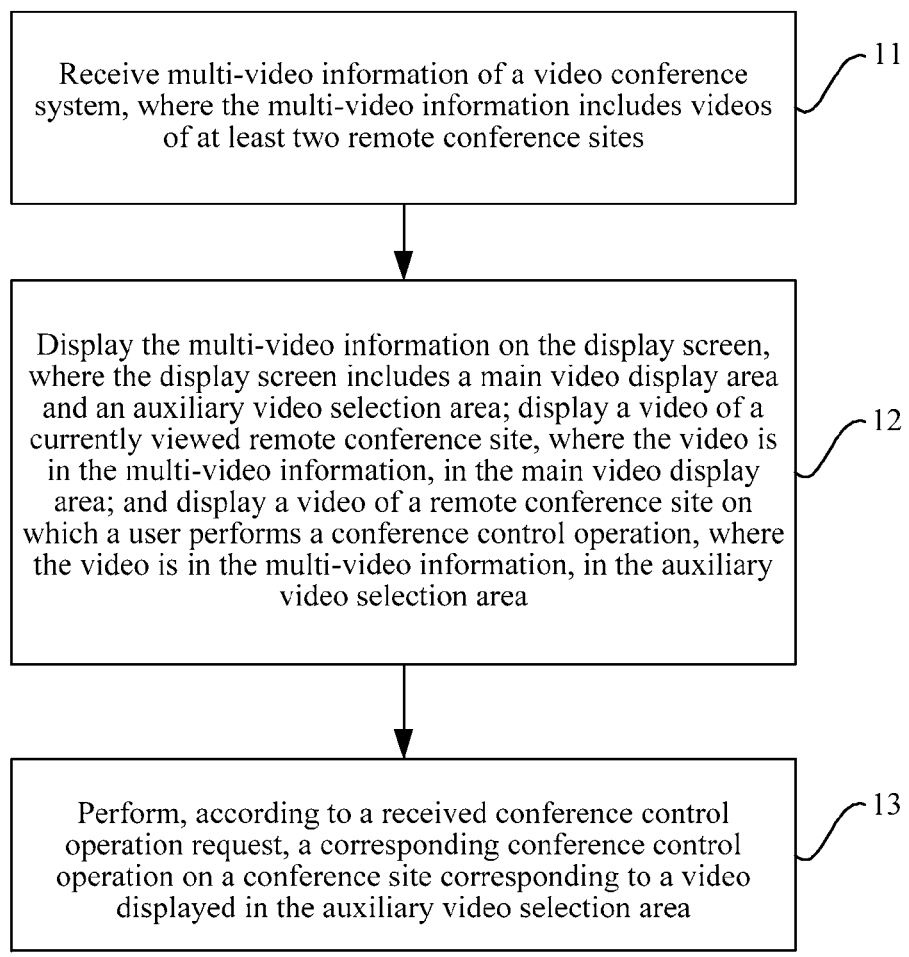
FIG. 1c is a flow chart of a video conference control method according to an embodiment of the present invention.

Referring to FIG. 1c, it is a flow chart of a video conference control method according to an embodiment of the present invention. As shown in FIG. 1c, an execution subject of the method of this embodiment may be a conference terminal, where the method includes:

Step 11: Receive multi-video information, where the multi-video information includes videos of at least two remote conference sites.

In this embodiment, the multi-video information may be processed by a device in a video conference system before being sent to the conference terminal. The foregoing device in the video conference system may be a multipoint processing server (specifically, a function of the multipoint processing server may be implemented by adopting an MCU), and may also be another device with a multipoint control function (for example, a conference terminal of a video conference, where the conference terminal integrates a multipoint processing and management function). In a word, for different network architecture of the video conference system, the multi-video information may be obtained by processing by different devices, which is of the prior art and is therefore is not repeatedly described here.

The multi-video information is a piece of video information which is a combination of video information of multiple remote conference sites, and the multi-video information includes the video information of the multiple remote conference sites. When a video of a remote conference site is displayed in an auxiliary video selection area, one of the following manners may be adopted: the video of the remote conference site is displayed according to sequence of a conference site priority; or the video of the remote conference site is displayed according to division of a location of the conference site; or the video of the remote conference site is displayed according to division of a conference theme.

When the video of the remote conference site is displayed according to the sequence of the conference site priority, the priority of each remote conference site needs to be set in advance. For example, the priority of a Beijing conference site is the highest, the priority of a Shanghai conference site is lower than it, and the priority of other conference sites is even lower. When the video of the remote conference site is displayed in the auxiliary video area, the video of the Beijing conference site is displayed in the very front, the video of the Shanghai conference site comes after it, and subsequently are the videos of other conference sites. In this way, a participant can browse a video of an important conference site first.

When the video of the remote conference site is displayed according to the division of the location of the conference site, videos of remote conference sites in a same region may be displayed in adjacent positions. For example, if there are two Beijing conference sites and three Shanghai conference sites, during displaying, the two Beijing conference sites may be arranged in adjacent locations for displaying, and the three Shanghai conference sites are arranged in adjacent locations for displaying. In this way, the participant can conveniently learn how many conference sites there are in one region, and can view the conference sites more conveniently.

When videos of remote conference sites are divided according to the conference themes, conference sites with a same conference theme may be arranged in adjacent locations for displaying. For example, for a conference theme 1, Beijing and Shanghai conference sites participate, and for a conference theme 2, Tianjin and Hebei conference sites participate.

When the videos of the remote conference sites are displayed in the auxiliary video area, the Beijing and Shanghai conference sites may be arranged in adjacent locations for displaying; and the Tianjin and Hebei conference site may be arranged in adjacent locations for displaying.

Step 12: Display the multi-video information on a display screen, where the display screen includes a main video display area and an auxiliary video selection area; display a video of a currently viewed remote conference site, where the video is in the multi-video information, in the main video display area; and display a video of a remote conference site on which the user performs a conference control operation, where the video is in the multi-video information, in the auxiliary video selection area.

What is displayed in the auxiliary video selection area is the video of the remote conference site on which the user performs a conference control operation, which may be the videos of all the remote conference sites (that is, the video of the remote conference site displayed in the main video display area is included), and may also be videos of other remote conference sites except the video of the remote conference site displayed in the main video display area.

As shown in FIG. 1b, a conference site video being viewed by a local conference site is displayed in the main video display area, and a video of a conference site to be previewed is displayed in the auxiliary video selection area. When the user performs a conference control operation on the conference site video of the auxiliary video selection area, another participant is not affected when viewing the conference site video of the main video display area.

A slide previewing manner may be adopted for displaying the video of the remote conference site in the auxiliary video selection area. The conference terminal calculates the size of the auxiliary video selection area according to information such as a picture type, a graph format, a display location parameter of a current multi-video, and so on, and further overlays a select box on the auxiliary video selection area. In this embodiment, the main video display area and the auxiliary video selection area are formed of a multi-picture, and a picture type of the multi-picture may be specified at the MCU and the conference terminal in advance, for example, a display manner that the main video display area is one large picture, and the auxiliary video selection area is five small pictures. If the conference site has multiple display screens spliced to display pictures of multiple conference sites, the conference site needs to display multiple groups of multi-pictures, and each display screen corresponds to one group of multi-picture. According to a preset rule, a multipicture of a corresponding group is displayed on each display screen.

The select box may be a frame larger than or equal to the size of one auxiliary video selection area, or the select box may also be in other manifestation, for example, a translucent rectangle overlaid on the auxiliary video selection area. The user may slide the select box left and right for sliding in the auxiliary video selection area, so that the select box falls on one certain video in the auxiliary video selection area, so as to lock the conference site video of the auxiliary video selection area. The shape of the select box is not limited by the embodiment of the present invention.

Step 13: Perform, according to a received conference control operation request, a corresponding conference control operation on a conference site corresponding to a video displayed in the auxiliary video selection area.

The user, after browsing and locking the conference site video of the auxiliary video selection area through the auxiliary video selection area, may perform a next conference control operation, for example, conference control operations such as broadcasting the conference site, roll calling the conference site, and deleting the conference site and so on. The foregoing conference control operation method is described in detail in the following embodiment.

There may be multiple remote conference sites, and therefore, not all the videos of the remote conference sites may be displayed in the auxiliary video selection area. For example, there are 20 remote conference sites, and the number of the videos that can be displayed in the auxiliary video selection area is only five. Therefore, the user, when previewing the conference site in a slide previewing manner and needing to browse a video of a remote conference site not displayed in the auxiliary video selection area, needs to request the video conference system to update the videos of the remote conference sites displayed in the auxiliary video selection area. Specifically, the following two methods may be adopted.

Method 1: When the user previews the conference site and the user slides the select box to request to browse the video of the remote conference site not displayed in the current auxiliary video selection area, an update request is sent to the multipoint processing server of the video conference system, and the multipoint processing server updates the videos of the remote conference sites displayed in the auxiliary video selection area: The multipoint processing server determines, according to the update request sent by the conference terminal, the video of the remote conference site that the auxiliary video selection area of the conference terminal needs to display, and sends the video of the remote conference site needing to be displayed to the conference terminal. The conference terminal, after receiving the video of the remote conference site needing to be displayed, updates and displays the video in the auxiliary video selection area.

Figure 1D:
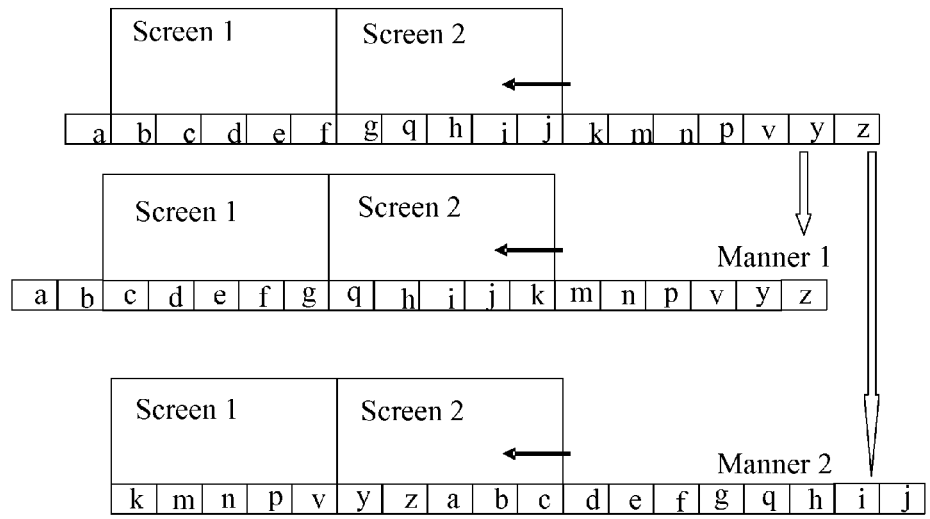
FIG. 1d is a schematic diagram of updating a video in an auxiliary video selection area according to an embodiment of the present invention.

FIG. 1*d* shows a schematic diagram of updating the video in the auxiliary video selection area. When the user moves the select box and the select box is moved to an edge of the auxiliary video selection area, for example, the select box is moved to a very right position or a very left position, if the user continues to move the select box, the conference terminal needs to invoke and display a video currently not displayed in the auxiliary video selection area. At this time, the conference terminal sends the update request to the multipoint processing server of the video conference system to request to update video display sequence of the auxiliary video selection area and display a video of a subsequent remote conference site. The multipoint processing server updates and displays the conference site videos displayed in the auxiliary video selection area.

In the foregoing method, when it is needed to invoke and display the video currently not displayed in the auxiliary video selection area, the video is obtained by sending the request to the multipoint processing server in the video conference system. It may be understood that, when the multi-video information is combined by a terminal that has a multipoint processing function, the request needs to be sent to a terminal into which the multipoint processing function is integrated.

As shown in FIG. 1*d*, a manner of updating and displaying the video of the remote conference site may be the following two.

(1) When a subsequent video is updated and displayed, width of one video is taken as a step for updating and displaying. Remote conference site videos to be browsed are scrolled and displayed in turn in the auxiliary video selection area, the videos that have been displayed in the auxiliary video selection area before are scrolled forward in turn (in the schematic diagram of FIG. 1*d*, the conference site videos in the screen are the displayed the conference site video, and the conference site videos outside the screen are the conference site videos to be displayed). As the manner 1 shown in the figure, when the user updates the video in a left direction, one video is updated to the left each time.

(2) When a subsequent video is updated and displayed, the conference site video is updated and displayed with width of the display screen as a step, and a next group of videos is updated and displayed each time. A next group of the conference site videos to be browsed is scrolled and displayed in the auxiliary video selection area (when multiple display screens are combined, and the number of each scrolled and displayed group of the conference site videos is not larger than the number of all the auxiliary video selection areas formed of the display screens in the current conference site), the conference site videos currently viewed in the auxiliary video selection area are replaced by the scrolled and displayed conference site videos. In FIG. 1*d*, the currently browsed conference site videos are b, c, d, e, f, g, q, h, i, and j in turn. The user selects rightward to preview the conference sites. Therefore, when the user slides the select box to j, and further slides to the right, the currently displayed conference site videos are refreshed, and k, m, n, p, v, y, z, a, b, and c are displayed.

The foregoing manner 1 is that the video of the conference site is updated and displayed with the width of one video as the step, and the manner 2 is that the video of the conference site is updated and displayed with the width of the display screen as the step. It may be understood that, the user may further limit other steps according to a need. For example, the user may adopt a click manner to click a touch screen of the display screen once, the video displayed on the screen steps to the left or to the right for one video. If clicking is performed twice, two videos are stepped. When clicking is performed for multiple times, stepping is continued until the user clicks the touch screen again, and at this time the updating of displaying of the videos of the display screen is stopped.

Figure 1E:
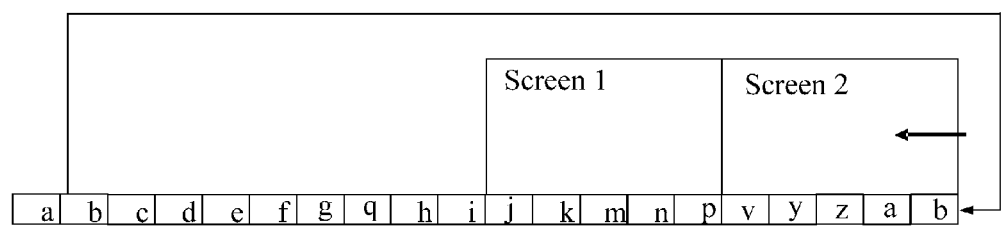
FIG. 1e is a schematic diagram of updating a video in an auxiliary video selection area according to an embodiment of the present invention.
Figure 1E:
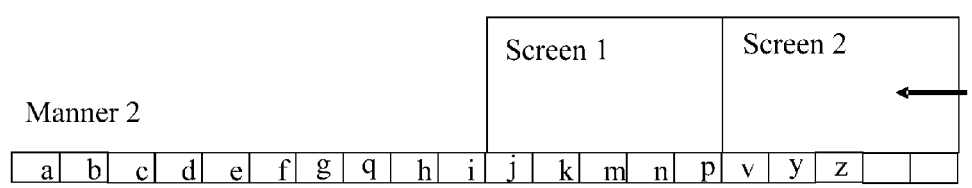

The manner of updating and displaying may adopt a one-way displaying manner, or may adopt a cyclic updating and displaying manner. For example, a schematic diagram of updating the video in the auxiliary video selection area is as shown in FIG. 1*e*. According to the manner 1 shown in FIG. 1*e*, the cyclic updating and displaying manner is a manner in which a display list is cyclic. A video displayed last is followed by a video displayed first; (where a and b are videos cyclically scrolled and displayed. The number of conference sites to be browsed is smaller than the number of previewable videos, so that a previous conference site video may be supplemented and displayed later). In the manner 2 shown in FIG. 1*e*, the one-way displaying manner is that the display list is one-way, the video displayed last is not followed by the video displayed first. That is, after the last displayed video is displayed, and when the displaying continues with a next one, it may be prompted the last video is displayed, or a blank video is used for filling.

Method 2: When the user browses the conference site, a solution of updating the videos in the auxiliary video selection area is that the select box is fixed and the videos of the auxiliary video selection area are slid and displayed. For example, the select box is fixed in a middle position, and the user may slide the conference site videos in the auxiliary video selection area on the touch display screen to browse. When the user slides the videos displayed in the auxiliary video selection area to request to browse the video of the remote conference site not displayed in the current auxiliary video selection area, an update request is sent to the multipoint processing server of the video conference system, and the multipoint processing server updates and displays the videos of the remote conference sites displayed in the auxiliary video selection area. With the left and right sliding operations of the user, each conference site video passes the select box in turn, and a conference site video entering the select box indicates a selected conference site video. Therefore, the user may perform a next operation on the selected conference site video, for example, perform an operation such as broadcasting the conference site and so on.

Figure 1F:
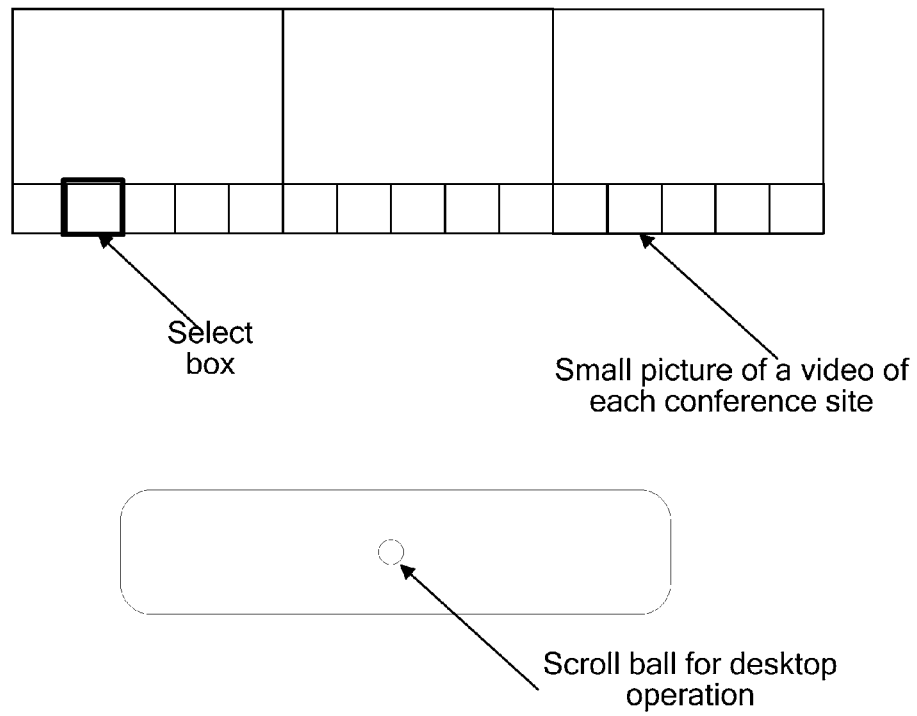
FIG. 1f is a first schematic diagram of a conference control operation tool according to an embodiment of the present invention.

There may be multiple kinds of tools that are used by the user on the conference terminal side to perform a conference control operation. For example, a small scroll ball for controlling is set on a conference desk where the conference terminal is placed, and a first schematic diagram of a conference control operation tool is as shown in FIG. 1*f*. In this scenario, when the user presses the small ball of a conference control operation interface, a conference video preview function is started, and the video of the remote conference site is displayed in the auxiliary video selection area. When the ball is scrolled to the left or to the right, the select box emerges, and after a certain conference site video is selected, the ball is pushed forward, which indicates that the conference site is broadcasted. When the ball is pushed backward, it indicates that the conference site is roll called for viewing. A specific function of the operation tool may be set according to a specific application need.

Figure 1G:
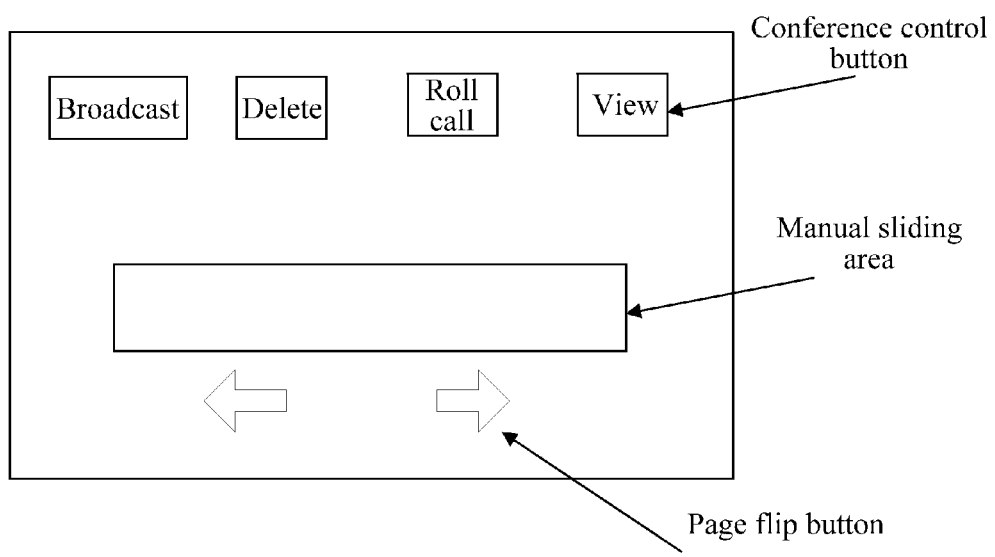
FIG. 1g is a second schematic diagram of a conference control operation tool according to an embodiment of the present invention.

In addition, the operation tool may also be a touch screen button or panel integrated on a desktop. A second schematic diagram of a conference control operation tool is as shown in FIG. 1g. In this scenario, when a touch screen display receives an operation instruction of left and right dragging of a finger of the user, a conference control operation of previewing the conference site videos in the auxiliary video selection area is started. A video of a certain conference site is selected during a preview procedure, and then is slid upward or downward, so that a corresponding conference control operation is performed. For example, sliding forward indicates that the conference site is broadcasted, and sliding backward indicates the conference site is roll called for viewing. Or a conference control operation button on it may be pressed directly, for example, a delete button is used to delete a selected conference site from the conference. In addition, for ease of quick conference site video positioning for the user, there may also be a page flip button, and the page flip button is clicked to view a next group of conference site videos to be previewed. Or it is determined, according to a direction in which the finger moves, that the selected conference site is displayed in which main video display area (in a case that the conference site includes multiple display screens), and selected conference site videos of the auxiliary video selection area may also be cyclically zoomed in for displaying in turn.

The conference control operation tool of the conference terminal sends operation information of the user to the conference terminal through a serial port or other network interfaces, and the conference terminal sends the control information to the video conference system of a network side. The conference control operation tool may be an integrated device that has a touch panel or a touch screen (such as a touch screen computer and a touch screen mobile phone), and may also be a device formed of multiple components in which an operation panel and a processing part are separated. If the conference site has multiple conference terminals, the operation tool interacts with the multiple conference terminals, and controls the multiple conference terminals.

In addition, the operation tool may also access the conference terminal through a unified control center device of a conference room. The conference control operation may also be identified through gestures. For example, a clenched first indicates starting of a conference site video previewing function, a palm waving to the left or to the right indicates a conference site selection procedure (the palm waves to the left or to the right to perform slide browsing, when a finger points to a certain conference site video, it indicates that the conference site is selected, and the select box moves to or emerges at the position), and upward, downward, forward, and backward indicates performing of a certain conference control operation, or a corresponding operational button is clicked directly to perform a conference control operation. The gesture information, after being identified and processed by the device, corresponds to a corresponding conference control command to perform a corresponding conference control operation.

Figure 1H:
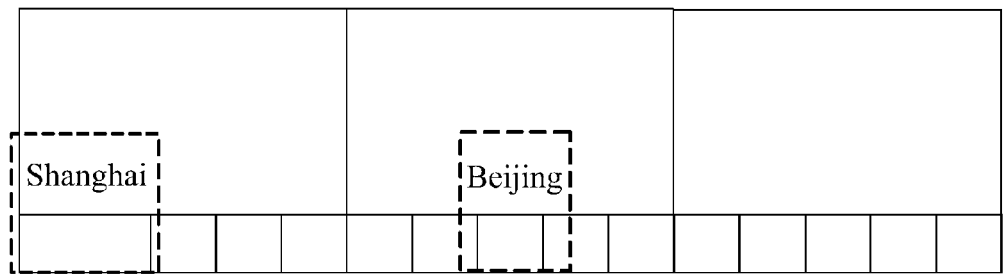
FIG. 1h is a schematic diagram of an interface of a display screen according to an embodiment of the present invention.

In addition, a schematic diagram of an interface of the display screen is as shown in FIG. 1h. The multipoint processing server of the video conference system, when generating the multi-video information, may also add comment information on the video of the remote conference site, where the comment information may include: information such as the location of the conference site and the conference theme and so on. The comment information of the conference site may be overlaid on a corresponding conference site video. If the video of the conference site includes multiple videos, the videos of the conference site may be displayed consecutively together, and the comment information is displayed on the consecutive videos. For example, a Shanghai conference site in FIG. 1h includes two video streams, and the conference terminal side displays the comment information that the location of the conference site is Shanghai on the two videos.

In addition, when displaying the comment information, the comment information may be displayed all the time, and alternatively the name of the conference site may be displayed only when the select box stops on the conference site video.

An example that a user performs a conference control operation of viewing a video is taken below for illustration of the video conference control method.

When the conference terminal receives a slide operation instruction in the touch display screen of the user, and a slide display manner is adopted to lock a video of a remote conference site of the auxiliary video selection area, a click instruction of a "view" button of the user is received, and the video of the conference site is played. The conference terminal may send a request of viewing the conference site to the multipoint processing server of the video conference system on the network side, and after receiving the request, the multipoint processing server plays the video of the conference site in the main video display area of the conference terminal.

To make the conference control operation of the conference site better and more human-centered, the conference control operation that the user may perform in this embodiment includes one or more of the following kinds.

Deleting the conference site: That is, a certain conference site in the conference is deleted.

Viewing the conference site: The conference site video that the user requests to view is displayed in a main video display area designated by the user. That is, the video of one remote conference site is selected to be viewed in the local conference site, while another conference site is not viewed together.

Broadcasting the conference site: The video of the remote conference site that the user requests to view is played in all the main video display areas of the conference sites, that is, all the conference sites in the conference view the video of the broadcasted conference site, and the broadcasted conference site may view its own video or not view its own video.

Roll calling the conference site: The video of the remote conference site that the user requests to view is displayed in the main video display area in the conference site, and a sound of the remote conference site is also played. Or a designated sound of the conference site may be played, for example, a microphone sound of a certain designated speaker, while other sounds are shielded, thereby achieving a conference site roll calling effect.

The viewing the conference site, broadcasting the conference site, and roll calling the conference site may be operations performed on all the videos of the selected conference site, or may be operations performed only on one certain video of the conference site, for example, a video of a camera of the remote conference site may be selected to view.

In addition, conference control operations such as hanging up the call, silencing, muting and so on may be performed on the conference site being viewed. Hanging up the call refers to terminating playing of the video and audio of the conference site. Silencing the conference site: The silenced conference site does not hear a sound of another conference site. Muted conference site: Each conference site cannot hear a sound of the muted conference site.

The video conference control method is introduced in the foregoing, and several implementation manners that the user browses the video in the auxiliary video selection area in the method are introduced in detail in the following. That the multipoint processing server of the video conference system adopts the MCU for implementation, and the conference terminal and the MCU perform interaction to implement video previewing is taken as an example for detailed introduction. The implementation manners of video previewing may be the following kinds.

Figure 2:
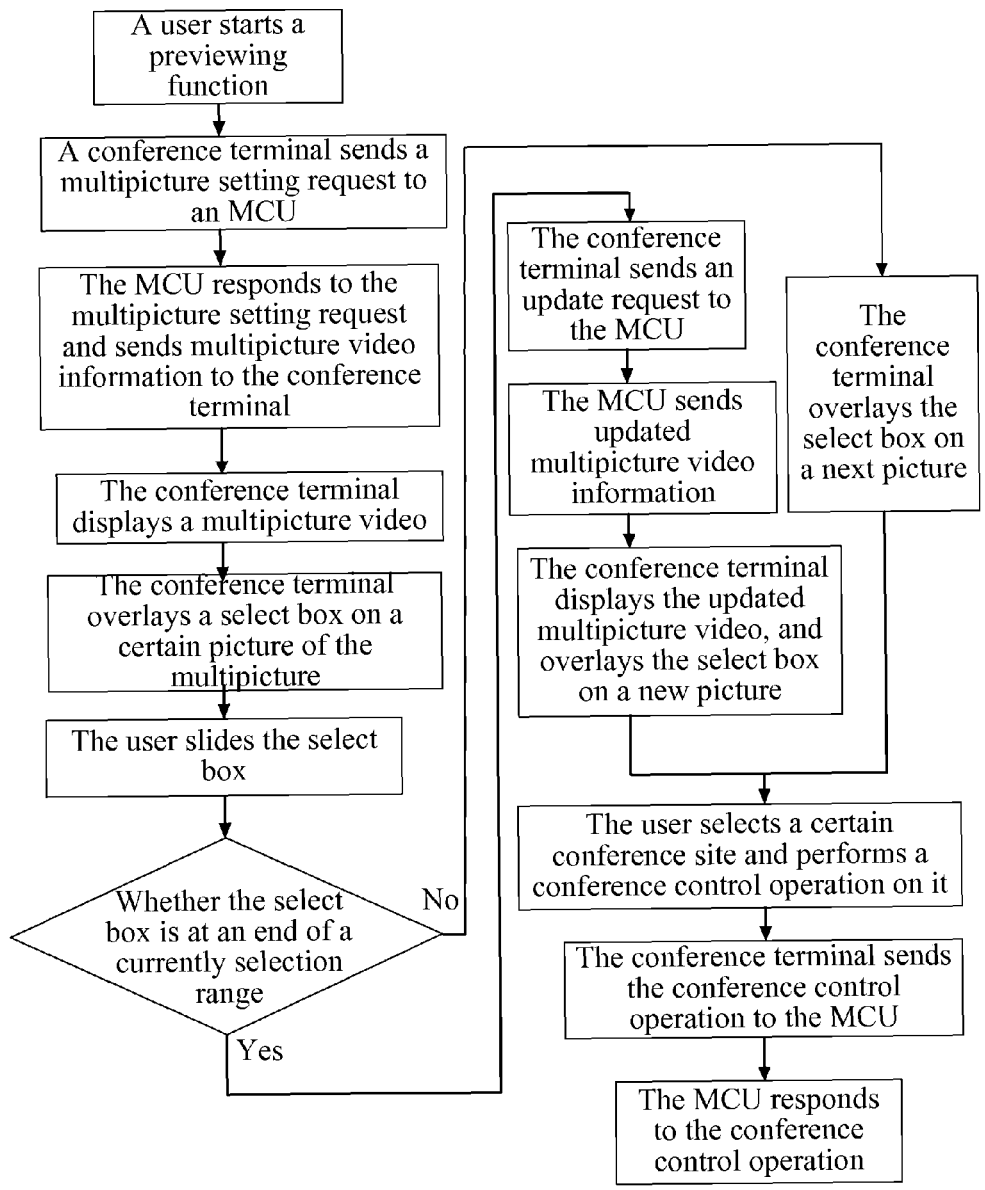
FIG. 2 is a flow chart of a first video previewing method according to an embodiment of the present invention.

Referring to FIG. 2, it is a flow chart of a first video previewing method according to this embodiment, and a process of the method is briefly described below with reference to FIG. 2.

When previewing a conference site video, a conference terminal sends a request of setting multipicture to an MCU, that is, to set a picture type of the multi-video. The picture type may adopt a display mode of a main video display area and an auxiliary video selection area, and may be, for example, a display manner that the main video display area shown in FIG. 1a is one large picture, and the auxiliary video selection area is five small pictures.

The MCU responds to a multipicture setting function, and sends a multipicture video to the conference terminal.

After the conference terminal receives multipicture video information, the multipicture video is displayed locally, and videos of multiple conference sites are displayed, that is, the manner of displaying in the main video display area and the auxiliary video selection area is adopted, so that multiple conference site videos are displayed on a display screen of a conference site.

At the same time, the conference terminal overlays a select box on a certain conference site video of the auxiliary video selection area. When the conference terminal receives, from the user, an operation command of sliding the select box, and an end of a selection range is not slid to (for example, a very front end or a very back end), the select box is overlaid on a next picture each time of sliding. When the select box slides to the end of the selection range, the conference terminal sends a request of updating the video of the auxiliary video selection area to the MCU, the MCU responds to the request, and sends updated multipicture video information to the conference terminal, and then the conference terminal displays the updated multipicture video, and overlays the select box on a new picture, thereby achieving an objective that the user previews the conference site video of the auxiliary video selection area. Afterward, the user may select a certain conference site video in the auxiliary video selection area to perform a conference control operation, the conference terminal sends the conference control operation to the MCU, and the MCU responds to the conference control operation.

Figure 3A:
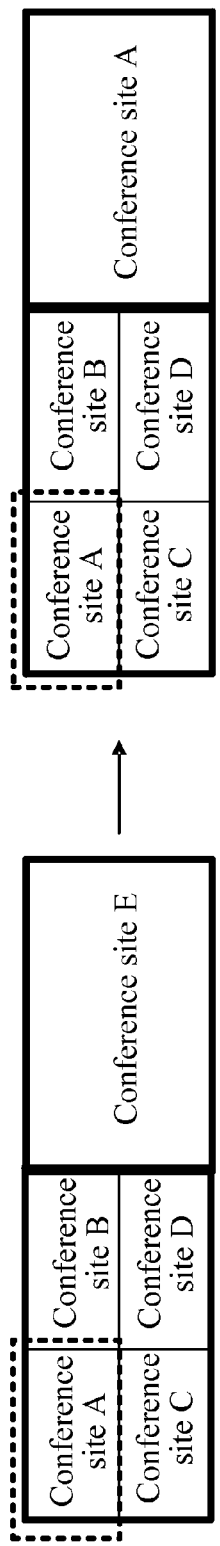
FIG. 3a is a first schematic diagram of a second video previewing scenario according to an embodiment of the present invention.
Figure 3B:
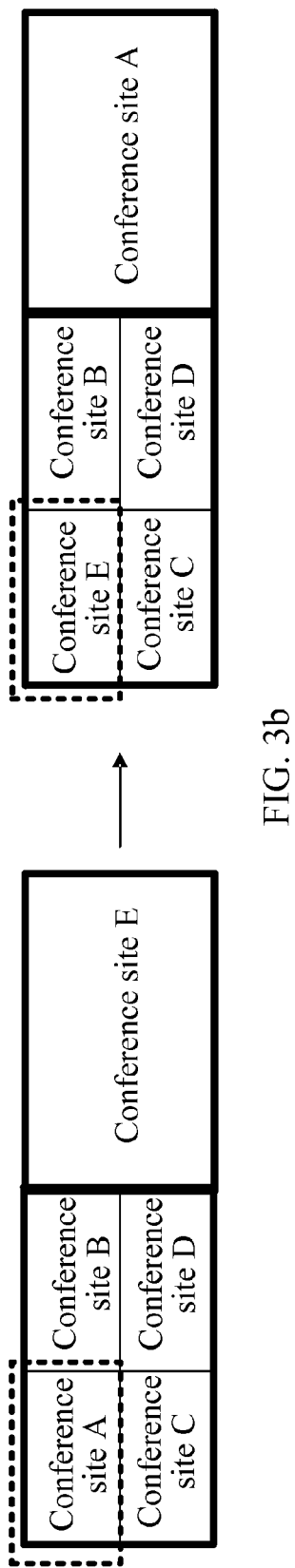
FIG. 3b is a second schematic diagram of a second video previewing scenario according to an embodiment of the present invention.

In addition, the following method may also be adopted: referring to FIG. 3a and FIG. 3b, schematic diagrams of a second video previewing scenario are shown. In this scenario, an auxiliary video selection area is located on one side of a main video display area; a select box of the auxiliary video selection area may slide from left to right, and from up to down; when a user selects a certain conference site video of the auxiliary video selection area, and executes a switch operation, the conference site video selected by the user is displayed in the main video display area, the conference site video selected by the user may disappear from a selected video area, or may still exist, which is as shown in a manner 1 in FIG. 3a and a manner 2 in FIG. 3b.

The user may directly view the video information to be previewed in the auxiliary video selection area, and may perform a conference control operation. When the user selects video information of a conference site E, video information of the conference site E is displayed in the current main video display area. Original video information of the conference site E in the auxiliary video selection area may be switched to original video information in the main video display area, or may also not be switched, and the original video information is still displayed.

Figure 4:
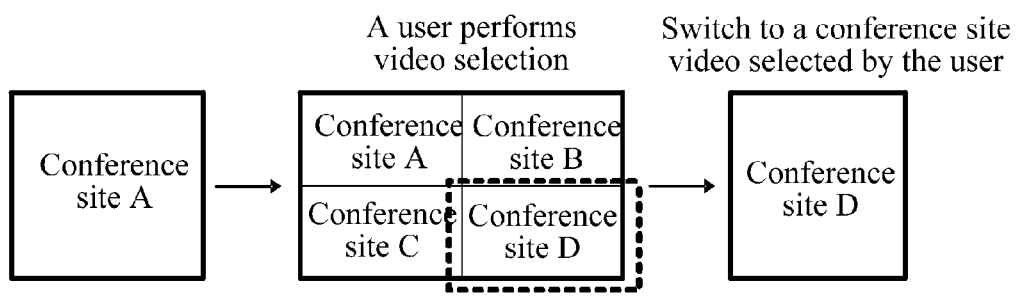
FIG. 4 is a schematic diagram of a third video previewing scenario according to an embodiment of the present invention.

The following method may also be adopted when a user previews a video. Referring to FIG. 4, a schematic diagram of a third video previewing scenario is shown. In this scenario, an auxiliary video selection area and a main video display area overlap. When the user needs to preview the video, for example, the user presses a button of video previewing, the auxiliary video selection area is displayed on a current display screen. The user may select, in the auxiliary video selection area, a conference site video needing to be viewed, and when the user selects a certain conference site video, and executes a switch operation, the current display screen is switched to the main video display area, and the conference site video selected by the user is displayed on it.

By using the foregoing three video selection manners, the user may preview the conference site video conveniently and quickly, and further execute a conference control operation according to a need.

According to this embodiment, the display screen is divided into the main video display area and the auxiliary video selection area, so that the user may perform the conference control operation on a video of a remote conference site through the auxiliary video selection area, and a conference site that needs to be viewed is displayed in the main video display area. Therefore, while viewing the video, the user may perform the conference control operation without diverting attention, which improves conference control operation experience of a video conference. In addition, the multipoint processing server does not need to generate an operation interface frequently, and therefore, a response speed of the multipoint processing server is improved, so that the conference site video can be refreshed quickly, and the user can perform the conference control operation smoothly.

Figure 5:
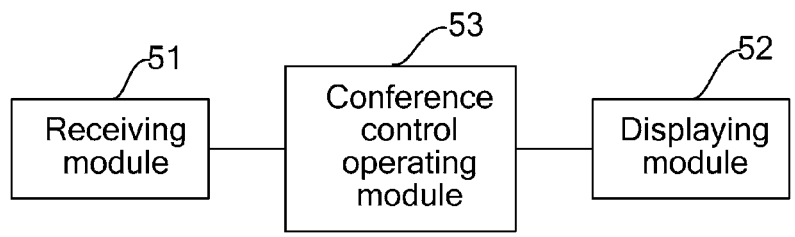
FIG. 5 is a schematic structural diagram of a conference terminal according to another embodiment of the present invention.

FIG. 5 is a schematic structural diagram of a conference terminal according to an embodiment of the present invention, including:

A receiving module 51 is configured to receive multi-video information, where the multi-video information includes videos of at least two remote conference sites.

A displaying module 52 is configured to display the multi-video information, where a main video display area and an auxiliary video selection area are included; display a video of a currently viewed remote conference site, where the video is in the multi-video information, in the main video display area; and display a video of a remote conference site on which a user performs a conference control operation, where the video is in the multi-video information, in the auxiliary video selection area.

The displaying module 52 displays, in the auxiliary video selection area, the video of the remote conference site according to the following preset policy, where the preset policy includes at least one of the following: the video of the remote conference site is displayed according to sequence of a conference site priority; or the video of the remote conference site is displayed according to division of a location of the conference site; or the video of the remote conference site is displayed according to division of a conference theme.

Further, the displaying module not only displays the video of the remote conference site in the auxiliary video selection area, but also displays comment information of the remote conference site, where the comment information includes, but is not limited to, the following information: a location of the remote conference site and a conference theme.

A conference control operating module 53 is configured to perform, according to a received conference control operation request, a corresponding conference control operation on a conference site corresponding to a video displayed in the auxiliary video selection area.

The conference control operation executed by the conference control operating module 53 may include one or more of the following: previewing the conference site, deleting the conference site, viewing the conference site, broadcasting the conference site or roll calling the conference site.

In this embodiment, it may be set that the area of the main video display area is larger than or equal to the area of the selection display area. For ease of previewing the conference site video by the user, a slide previewing manner may be adopted. The conference control operating module 53 is specifically configured to, when a conference control operation request of previewing the conference site by the user is received, adopt the slide previewing manner to slide and display the video of the remote conference site in the auxiliary video selection area.

Further, the conference control operating module 53 is configured to display one select box in the auxiliary video selection area, so that the user slides the select box to browse the video of the remote conference site.

When the user slides to an edge of the auxiliary video selection area and continues to slide, the conference terminal needs to request a video conference system to update the conference site video in the auxiliary video selection area. The conference control operating module 53 is configured to, when the request that the user slides the select box to browse a video of a remote conference site not displayed in the current auxiliary video selection area, send an update request to a multipoint processing server of the video conference system, so that the multipoint processing server updates the video of the remote conference site displayed in the auxiliary video selection area.

In addition, a manner of overlaying the select box may not be adopted, and the user slides the conference site to preview the conference site. The conference control operating module 53 is configured to, when the request that the user slides the video displayed in the auxiliary video selection area to browse the video of the remote conference site not displayed in the current auxiliary video selection area, send an update request to the multipoint processing server of the video conference system, so that the multipoint processing server updates the video of the remote conference site displayed in the auxiliary video selection area.

The conference control operating module 53 may adopt a cyclic updating and displaying manner or a one-way displaying manner to update and display the video of the remote conference site displayed in the auxiliary video selection area. The method is the same as that in the foregoing embodiment, which is not repeatedly described here.

Reference may be made to the description of the embodiments corresponding to FIG. 1a to FIG. 4 for a function of the conference terminal and an interaction mechanism between the conference terminal and the video conference system and an effect in this embodiment, which is not repeatedly described here.

According to the embodiment, a display screen is divided into the main video display area and the auxiliary video selection area, so that the user may perform a conference control operation on the video of the remote conference site through the auxiliary video selection area, and a conference site that needs to be viewed is displayed in the main video display area. Therefore, while viewing the video, the user may perform the conference control operation without diverting attention, thereby improving conference control operation experience of the video conference. In addition, the multipoint processing server does not need to generate an operation interface frequently, and therefore, a response speed of the multipoint processing server is improved, so that the conference site video can be refreshed quickly, and the user can perform a conference control operation smoothly.

Persons of ordinarily skill in the art may understand that the accompanying drawings are merely schematic diagrams of an embodiment, and the modules or processes in the accompanying drawings are not necessarily required for implementing the present invention.

Persons of ordinary skill in the art may understand that modules in the apparatus provided in the embodiment may be arranged in the apparatus in a distributed manner according to the description of the embodiment, and may also be arranged in one or more apparatuses which are different from that described in the embodiments. The modules in the foregoing embodiments may be combined into one module, and may also be split into multiple submodules.

The sequence numbers of the foregoing embodiments of the present invention are merely for description, and do not imply the preference among the embodiments.

Persons of ordinary skill in the art may understand that all of or part of the steps of the foregoing methods embodiments may be implemented by a program instructing relevant hardware. The program may be stored in a computer readable storage medium. When the program is executed, the steps of the foregoing methods embodiments are executed. The storage medium may include various media that may store program codes, such as a ROM, a RAM, a magnetic disk, or a compact disk and so on.

Finally, it should be noted that the foregoing embodiments are merely intended for describing the technical solutions of the present invention, but are not intended to limit the present invention. Although the present invention is described in detail with reference to the foregoing embodiments, persons of ordinary skill in the art should understand that they may still make modifications to the technical solutions described in the foregoing embodiments or make equivalent replacements to part of the technical features, while such modifications or replacements do not make the nature of relevant technical solutions depart from the spirit and scope of the technical solutions of the embodiments of the present invention.

What is claimed is:

1. A video conference control method, comprising:
receiving multi-video information including videos of two or more conference sites;
displaying at least a portion of the videos of the two or more conferences sites on a display screen including a main video display area and an auxiliary video selection area;
displaying, in the main video display area, a first video of a first conference site, wherein the first video is included in the multi-video information;
displaying, in the auxiliary video selection area in a slide manner, at least a second video of a second conference site included in the multi-video information; and
performing, according to a received conference control operation request, a previewing conference control operation that includes;
sending an update request to a multipoint processing server so that the multipoint processing server updates the multi-video information to include at least a third video of a third conference site not currently displayed in the auxiliary video selection area, and displaying, in the auxiliary video selection area in a slide manner, at least the third video;

wherein the received conference control operation request includes a request to display a video of a conference site not currently displayed in the auxiliary video selection area.

2. The video conference control method according to claim 1, the method further comprising, performing, according to a next received conference control operation request, a corresponding next conference control operation;

wherein the next conference control operation comprises one or more of deleting the conference site, viewing the conference site, broadcasting the conference site, and roll calling the conference site.

3. The video conference control method according to claim 1, wherein displaying, in the auxiliary video selection area in the slide manner, at least the second video comprises:

displaying one select box in the auxiliary video selection area, so that when the user slides the select box over the second video, the second video of the remote conference site is displayed in the slide manner.

4. The video conference control method according to claim 3, wherein the received conference control operation request is a received request of sliding the select box by the user to display a video of a remote conference site not displayed in the current auxiliary video selection area.

5. The video conference control method according to claim 1, wherein any one of the following manners is adopted to display for the updating and displaying:

a cyclic updating and displaying manner, and a one-way displaying manner.

6. The video conference control method according to claim 1, further comprising displaying, at the auxiliary video selection area, comment information of at least the second conference site, and the comment information comprises at least one kind of the following information: a name of a location of the remote conference site, and a conference theme.

7. The video conference control method according to claim 1, wherein displaying, in the auxiliary video selection area in a slide manner, at least the second video is performed according to a preset policy selected from one of the group consisting of:

at least the second video is displayed according to sequence of a conference site priority;

at least the second video is displayed according to division of a location of the conference site; and at least the second video is displayed according to division of a conference theme.

8. A conference terminal, comprising:

a receiving module, configured to receive multi-video information including videos of two or more conference sites;

a displaying module, configured to provide, for display, at least a portion of the multi-video information by providing a first video included in the multi-video information for display at a main video display area and providing a second video included in a multi-video information for display in a slide manner at an auxiliary video selection area; and a conference control operating module, configured to perform, according to a received conference control operation request, a previewing conference control operation that includes:

sending an update request to a multipoint processing server so that the multipoint processing server updates the multi-video information to include at least a third video of a third conference site not currently displayed in the auxiliary video selection area, and displaying, the auxiliary video selection area in a slide manner, at least the third video;

wherein the received conference control operation request includes a request to display a video of a conference site not currently displayed in the auxiliary video selection area.

9. The conference terminal according to claim 8, wherein the conference control operation executed by the conference control operating module further comprises one or more of the following: deleting the conference site, viewing the conference site, broadcasting the conference site or roll calling the conference site.

10. The conference terminal according to claim 8, wherein the conference control operating module is further configured to display a select box in the auxiliary video selection area, so that when the user slides the select box over the second video, the second video is selected for a conference control operation.

11. The conference terminal according to claim 10, wherein the received conference control operation is a request of sliding the select box by the user to display a video of a conference site not currently displayed in the auxiliary video selection area.

12. The conference terminal according to claim 8, wherein the conference control operating module is configured to provide for videos to be displayed in the auxiliary video selection area in a manner selected from the group consisting of: a cyclic updating and displaying manner, and a one-way displaying manner.

13. The conference terminal according to claim 8, wherein the displaying module is further configured to provide for display comment information of at least the first or second conference site, wherein the comment information comprises at least one of a name of a location of a conference site and a conference theme.

14. The conference terminal according to claim 8, wherein the displaying module provides for display the second video in the auxiliary video selection area according to a preset policy selected from one of the group consisting of:

at least the second video is displayed according to sequence of a conference site priority;

at least the second video is displayed according to division of a location of the conference site; and at least the second video is displayed according to division of a conference theme.

15. A video conference method, comprising:

receiving multi-video information including videos of two or more conference sites;

displaying at least a portion of the videos of the two or more conference sites on a display screen including a main video display area and an auxiliary video selection area;

displaying, in the main video display area, a first video of a first conference site, wherein the first video is included in the multi-video information;

displaying, the auxiliary video selection area in a slide manner, at least a second video of a second conference site, included in the multi-video information;

displaying, at the auxiliary video selection area, comment information of at least the second conference site, the comment information including at least one of a name of a location of the remote conference site and a conference theme; and performing, according to a received conference control operation request, a conference control operation that includes displaying a video of a conference site in the auxiliary video selection area in a slide manner.

* * * * *